Nov. 1, 1955 W. A. HIPP ET AL 2,722,452
AUTOMATIC FUMIGATING DEVICE
Filed March 21, 1955

INVENTORS
FRED B. JACOBSON
WILLIAM A. HIPP
BY
ATTORNEY

United States Patent Office 2,722,452
Patented Nov. 1, 1955

2,722,452

AUTOMATIC FUMIGATING DEVICE

William A. Hipp, Haddonfield, N. J., and Fred B. Jacobson, Philadelphia, Pa., assignors to C. Schmidt and Sons, Inc., Philadelphia, Pa., a corporation of Pennsylvania Application March 21, 1955, Serial No. 495,590

1 Claim. (Cl. 299—20)

In the brewing industry and in other industries, large amounts of grain are used and such grain is transported from the storage bins to the place of use by means of screw, or other enclosed conveyors, which can be relatively long. In order to guard against infestation by insects, these conveyors must be fumigated from time to time.

It is therefore the object of our invention to produce an improved means for automatically fumigating the conveyors which move the grain toward the vats.

The nature of the invention will be understood from the following specification and the accompanying drawings in which.

Figure 1:
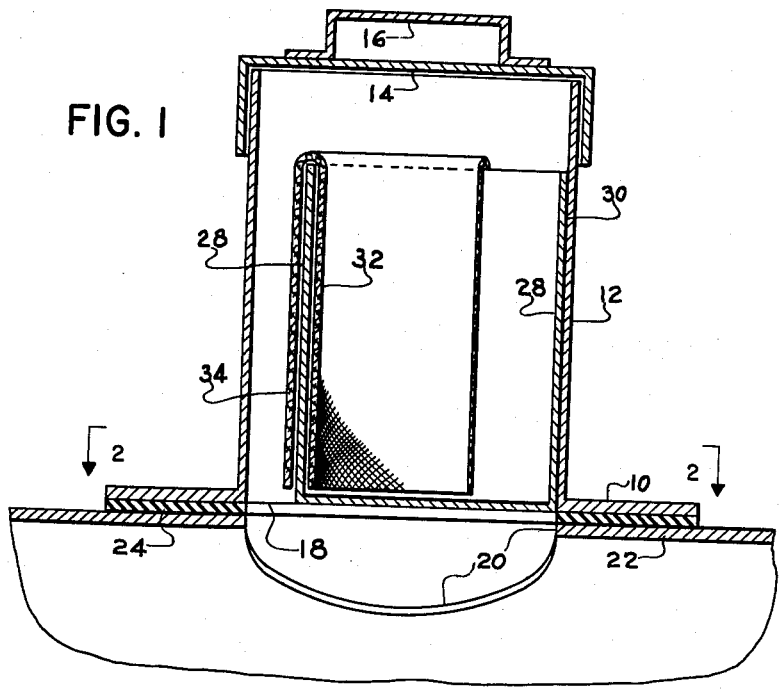
Figure 1 is a vertical, cross-sectional view of a fumigator embodying the invention, the same being shown applied to an opening formed in the wall of a conveyor, through which grain is moved.

The fumigator includes a base plate 10 which carries a cylinder 12 of the desired size. The upper open end of cylinder 12 is closed by a detachable closure 14 which is provided with a handle 16. The bottom of cylinder 12 is open as at 18 and communicates through opening 20 with the interior of a screw conveyor 22 or other conduit through which grain is propelled. In order to form a tight joint, a gasket 24 is placed between base plate 10 and the wall of the conveyor.

Figure 2:
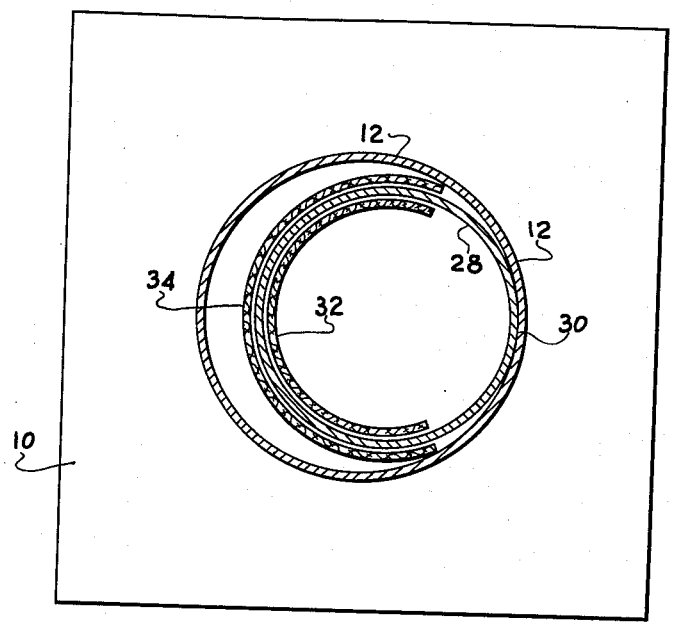
Figure 2 is a horizontal section on line 2—2 on Fig. 1, the pipe being omitted.

The volatile fumigant to be used is placed in a smaller container 28 which is disposed excentrically of outer cylinder 12 and which is secured to the cylinder as at 30. In order to transmit the fumigant from container 28 to the interior of the conveyor, we use a wick which is folded to form an inner wall 32, which is disposed within container 28, and an outer wall 34, which is disposed outside of container 28 and which registers with opening 18. As will be seen from Figure 2, the wick is made as big as possible so as to present a large absorption surface to the liquid in container 28 and so as to present a large evaporation surface to the air in the space between container 28 and cylinder 10. By this arrangement, the interior of conveyor 22 will be fumigated automatically, it being merely necessary to place a supply of fumigant in container 28 and to seal the conveyor off for the requisite period of time.

What we claim is:

A fumigating device including an open ended cylinder, a detachable closure for the upper, open end thereof, a relatively smaller cylindrical fumigant-storing container disposed within, and secured to the inner wall of, said cylinder whereby a space is left between the said container and said cylinder which space communicates with the bottom open end of said cylinder, an absorbent wick disposed partly within said container and partly in said space, and means for securing said cylinder to a conduit through which the material to be fumigated moves, there being an opening in a wall of said conduit in registration with the open bottom end of said cylinder.

References Cited in the file of this patent

UNITED STATES PATENTS

| | | |
|---|---|---|
| 680,621 | Rockwell | Aug. 13, 1901 |
| 2,212,439 | Hendey | Aug. 20, 1940 |